(12) United States Patent
Rosenbluth et al.

(10) Patent No.: US 7,107,413 B2
(45) Date of Patent: Sep. 12, 2006

(54) WRITE QUEUE DESCRIPTOR COUNT INSTRUCTION FOR HIGH SPEED QUEUING

(75) Inventors: Mark B. Rosenbluth, Uxbridge, MA (US); Debra Bernstein, Sudbury, MA (US); Gilbert Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 572 days.

(21) Appl. No.: 10/024,502

(22) Filed: Dec. 17, 2001

(65) Prior Publication Data

US 2003/0115426 A1    Jun. 19, 2003

(51) Int. Cl.
G06F 12/00 (2006.01)

(52) U.S. Cl. .......... 711/154; 711/108; 711/133; 711/159; 370/412; 709/216; 710/54

(58) Field of Classification Search .......... 711/154, 711/159, 108, 133; 370/412; 709/216; 710/54
See application file for complete search history.

(56) References Cited

U.S. PATENT DOCUMENTS

| | | |
|---|---|---|
| 3,373,408 A | 3/1968 | Ling |
| 3,478,322 A | 11/1969 | Evans |
| 3,792,441 A | 2/1974 | Wymore et al. |
| 3,940,745 A | 2/1976 | Sajeva |
| 4,130,890 A | 12/1978 | Adam |
| 4,400,770 A | 8/1983 | Chan et al. |
| 4,514,807 A | 4/1985 | Nogi |
| 4,523,272 A | 6/1985 | Fukunaga et al. |
| 4,745,544 A | 5/1988 | Renner et al. |
| 4,866,664 A | 9/1989 | Burkhardt, Jr. et al. |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,168,555 A | 12/1992 | Byers et al. |
| 5,173,897 A | 12/1992 | Schrodi et al. |
| 5,185,861 A | 2/1993 | Valencia ............... 711/120 |
| 5,255,239 A | 10/1993 | Taborn et al. |
| 5,263,169 A | 11/1993 | Genusov et al. |
| 5,268,900 A | 12/1993 | Hluchyj et al. ........ 370/429 |
| 5,347,648 A | 9/1994 | Stamm et al. |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,482 A | 4/1995 | Stamm et al. |

(Continued)

FOREIGN PATENT DOCUMENTS

EP    0 379 709    8/1990

(Continued)

OTHER PUBLICATIONS

U.S. Appl. No. 09/475,614, filed Dec. 30, 1999 Wolrich et al.

(Continued)

*Primary Examiner*—Stephen C. Elmore
(74) *Attorney, Agent, or Firm*—Fish & Richardson P.C.

(57) ABSTRACT

Methods and apparatus, including computer program products, for a write queue descriptor count instruction for high speed queuing. A write queue descriptor count command causes a processor to write a single word containing a queue count for each of a plurality of queue entries in a queue array cache.

13 Claims, 7 Drawing Sheets

U.S. PATENT DOCUMENTS

| | | |
|---|---|---|
| 5,432,918 A | 7/1995 | Stamm |
| 5,448,702 A | 9/1995 | Garcia, Jr. et al. |
| 5,450,351 A | 9/1995 | Heddes |
| 5,452,437 A | 9/1995 | Richey et al. |
| 5,459,842 A | 10/1995 | Begun et al. |
| 5,463,625 A | 10/1995 | Yasrebi |
| 5,467,452 A | 11/1995 | Blum et al. |
| 5,517,648 A | 5/1996 | Bertone et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,617 A | 10/1996 | Kametani |
| 5,574,922 A | 11/1996 | James |
| 5,592,622 A | 1/1997 | Isfeld et al. |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,130 A | 5/1997 | Perotto et al. |
| 5,634,015 A | 5/1997 | Chang et al. ............... 710/310 |
| 5,644,623 A | 7/1997 | Gulledge |
| 5,649,092 A | 7/1997 | Price et al. ................... 714/15 |
| 5,649,157 A | 7/1997 | Williams |
| 5,659,687 A | 8/1997 | Kim et al. |
| 5,671,446 A | 9/1997 | Rakity et al. ................. 710/54 |
| 5,680,641 A | 10/1997 | Sidman |
| 5,684,962 A | 11/1997 | Black et al. ................ 709/238 |
| 5,689,566 A | 11/1997 | Nguyen |
| 5,699,537 A | 12/1997 | Sharangpani et al. |
| 5,717,898 A | 2/1998 | Kagan et al. |
| 5,721,870 A | 2/1998 | Matsumoto |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant-Shetti et al. |
| 5,761,507 A | 6/1998 | Govett |
| 5,761,522 A | 6/1998 | Hisanaga et al. |
| 5,781,774 A | 7/1998 | Krick |
| 5,784,649 A | 7/1998 | Begur et al. |
| 5,784,712 A | 7/1998 | Byers et al. |
| 5,796,413 A | 8/1998 | Shipp et al. |
| 5,797,043 A | 8/1998 | Lewis et al. |
| 5,809,235 A | 9/1998 | Sharma et al. |
| 5,809,530 A | 9/1998 | Samra et al. |
| 5,812,868 A | 9/1998 | Moyer et al. |
| 5,828,746 A | 10/1998 | Ardon |
| 5,828,863 A | 10/1998 | Barrett et al. |
| 5,832,215 A | 11/1998 | Kato et al. |
| 5,835,755 A | 11/1998 | Stellwagen, Jr. |
| 5,850,395 A | 12/1998 | Hauser et al. ............... 370/398 |
| 5,854,922 A | 12/1998 | Gravenstein et al. |
| 5,860,158 A | 1/1999 | Pai et al. |
| 5,872,769 A | 2/1999 | Caldara et al. ............. 370/230 |
| 5,873,089 A | 2/1999 | Regache .................... 707/100 |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,893,162 A | 4/1999 | Lau et al. ................... 711/153 |
| 5,905,876 A | 5/1999 | Pawlowski et al. |
| 5,905,889 A | 5/1999 | Wilhelm, Jr. |
| 5,915,123 A | 6/1999 | Mirsky et al. |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,958,031 A | 9/1999 | Kim |
| 5,961,628 A | 10/1999 | Nguyen et al. |
| 5,970,013 A | 10/1999 | Fischer et al. |
| 5,974,518 A | 10/1999 | Nogradi |
| 5,978,838 A | 11/1999 | Mohamed et al. |
| 5,983,274 A | 11/1999 | Hyder et al. |
| 6,012,151 A | 1/2000 | Mano |
| 6,014,729 A | 1/2000 | Lannan et al. |
| 6,023,742 A | 2/2000 | Ebeling et al. |
| 6,058,168 A | 5/2000 | Braband |
| 6,067,585 A | 5/2000 | Hoang |
| 6,070,231 A | 5/2000 | Ottinger |
| 6,072,781 A | 6/2000 | Feeney et al. |
| 6,073,215 A | 6/2000 | Snyder |
| 6,079,008 A | 6/2000 | Clery, III |
| 6,085,215 A | 7/2000 | Ramakrishnan et al. |
| 6,085,294 A | 7/2000 | Van Doren et al. |
| 6,092,127 A | 7/2000 | Tausheck |
| 6,092,158 A | 7/2000 | Harriman et al. |
| 6,112,016 A | 8/2000 | MacWilliams et al. |
| 6,134,665 A | 10/2000 | Klein et al. |
| 6,141,689 A | 10/2000 | Yasrebi |
| 6,141,765 A | 10/2000 | Sherman |
| 6,144,669 A | 11/2000 | Williams et al. |
| 6,145,054 A | 11/2000 | Mehrotra et al. |
| 6,157,955 A | 12/2000 | Narad et al. |
| 6,160,562 A | 12/2000 | Chin et al. |
| 6,182,177 B1 | 1/2001 | Harriman |
| 6,195,676 B1 | 2/2001 | Spix et al. |
| 6,199,133 B1 | 3/2001 | Schnell |
| 6,201,807 B1 | 3/2001 | Prasanna |
| 6,212,542 B1 | 4/2001 | Kahle et al. |
| 6,212,611 B1 | 4/2001 | Nizar et al. |
| 6,216,220 B1 | 4/2001 | Hwang |
| 6,223,207 B1 | 4/2001 | Lucovsky et al. |
| 6,223,238 B1 | 4/2001 | Meyer et al. |
| 6,223,279 B1 | 4/2001 | Nishimura et al. |
| 6,247,025 B1 | 6/2001 | Bacon |
| 6,256,713 B1 | 7/2001 | Audityan et al. |
| 6,272,616 B1 | 8/2001 | Fernando et al. |
| 6,275,505 B1 | 8/2001 | O Loughlin et al. |
| 6,279,113 B1 | 8/2001 | Vaidya |
| 6,289,011 B1 | 9/2001 | Seo et al. |
| 6,298,370 B1 | 10/2001 | Tang et al. |
| 6,307,789 B1 | 10/2001 | Wolrich et al. |
| 6,320,861 B1 | 11/2001 | Adam et al. ............. 370/395.7 |
| 6,324,624 B1 | 11/2001 | Wolrich et al. |
| 6,345,334 B1 | 2/2002 | Nakagawa et al. |
| 6,347,341 B1 * | 2/2002 | Glassen et al. ............. 709/250 |
| 6,347,344 B1 | 2/2002 | Baker et al. |
| 6,351,474 B1 | 2/2002 | Robinett et al. ............ 370/486 |
| 6,356,962 B1 | 3/2002 | Kasper et al. |
| 6,359,911 B1 | 3/2002 | Movshovich et al. |
| 6,360,262 B1 | 3/2002 | Guenthner et al. |
| 6,373,848 B1 | 4/2002 | Allison et al. |
| 6,385,658 B1 | 5/2002 | Harter et al. ............... 719/312 |
| 6,389,449 B1 | 5/2002 | Nemirovsky et al. |
| 6,393,483 B1 | 5/2002 | Latif et al. |
| 6,393,531 B1 | 5/2002 | Novak et al. ............... 711/154 |
| 6,415,338 B1 | 7/2002 | Habot |
| 6,426,940 B1 | 7/2002 | Seo et al. |
| 6,426,957 B1 | 7/2002 | Hauser et al. ............... 370/413 |
| 6,427,196 B1 | 7/2002 | Adiletta et al. |
| 6,430,626 B1 | 8/2002 | Witkowski et al. |
| 6,434,145 B1 | 8/2002 | Opsasnick et al. |
| 6,438,651 B1 | 8/2002 | Slane .......................... 711/118 |
| 6,463,072 B1 | 10/2002 | Wolrich et al. |
| 6,522,188 B1 | 2/2003 | Poole |
| 6,523,060 B1 | 2/2003 | Kao ........................... 709/202 |
| 6,532,509 B1 | 3/2003 | Wolrich et al. |
| 6,539,024 B1 | 3/2003 | Janoska et al. ............. 370/229 |
| 6,552,826 B1 | 4/2003 | Adler et al. |
| 6,560,667 B1 | 5/2003 | Wolrich et al. |

| | | |
|---|---|---|
| 6,577,542 B1 | 6/2003 | Wolrich et al. |
| 6,584,522 B1 | 6/2003 | Wolrich et al. |
| 6,587,906 B1 | 7/2003 | Wolrich et al. |
| 6,606,704 B1 | 8/2003 | Adiletta et al. |
| 6,625,654 B1 | 9/2003 | Wolrich et al. |
| 6,631,430 B1 | 10/2003 | Wolrich et al. |
| 6,631,462 B1 | 10/2003 | Wolrich et al. |
| 6,658,546 B1 | 12/2003 | Calvignac et al. .......... 370/429 |
| 6,661,794 B1 | 12/2003 | Wolrich et al. |
| 6,667,920 B1 | 12/2003 | Wolrich et al. |
| 6,668,317 B1 | 12/2003 | Bernstein et al. |
| 6,681,300 B1 | 1/2004 | Wolrich et al. |
| 6,684,303 B1 | 1/2004 | LaBerge .................... 711/154 |
| 6,687,247 B1 | 2/2004 | Wilford et al. ............. 370/412 |
| 6,694,380 B1 | 2/2004 | Wolrich et al. |
| 6,724,721 B1 | 4/2004 | Cheriton .................... 370/429 |
| 6,728,845 B1 | 4/2004 | Adiletta et al. ............. 711/154 |
| 6,731,596 B1 | 5/2004 | Chiang et al. .............. 370/225 |
| 6,754,223 B1 | 6/2004 | Lussier et al. ............. 370/412 |
| 6,757,791 B1 | 6/2004 | O'Grady et al. ........... 370/412 |
| 6,768,717 B1 * | 7/2004 | Reynolds et al. ........ 370/230.1 |
| 6,779,084 B1 | 8/2004 | Wolrich et al. ............. 711/118 |
| 6,791,989 B1 | 9/2004 | Steinmetz et al. .......... 370/394 |
| 6,795,447 B1 | 9/2004 | Kadambi et al. ........... 370/412 |
| 6,804,239 B1 | 10/2004 | Lussier et al. ............. 370/392 |
| 6,810,426 B1 | 10/2004 | Mysore et al. ............. 709/234 |
| 6,813,249 B1 | 11/2004 | Lauffenburger et al. .... 370/253 |
| 6,816,498 B1 | 11/2004 | Viswanath .................. 370/412 |
| 6,822,958 B1 | 11/2004 | Branth et al. .......... 370/395.31 |
| 6,822,959 B1 | 11/2004 | Galbi et al. ................. 370/392 |
| 6,842,457 B1 | 1/2005 | Malalur ...................... 370/428 |
| 6,850,999 B1 | 2/2005 | Mak et al. .................... 710/39 |
| 6,868,087 B1 | 3/2005 | Agarwala et al. ........... 370/412 |
| 6,876,561 B1 | 4/2005 | Wolrich et al. ............... 365/49 |
| 6,888,830 B1 | 5/2005 | Snyder, II et al. .......... 370/912 |
| 6,895,457 B1 | 5/2005 | Wolrich et al. ............. 710/100 |
| 6,975,637 B1 | 12/2005 | Lenell ....................... 370/412 |
| 2001/0014100 A1 | 8/2001 | Abe et al. ................... 370/412 |
| 2002/0131443 A1 | 9/2002 | Robinett et al. ............ 370/442 |
| 2002/0144006 A1 | 10/2002 | Cranston et al. ............ 709/312 |
| 2002/0196778 A1 | 12/2002 | Colmant et al. ............ 370/352 |
| 2003/0041216 A1 | 2/2003 | Rosenbluth et al. ........ 711/141 |
| 2003/0046488 A1 | 3/2003 | Rosenbluth et al. ........ 711/108 |
| 2003/0110166 A1 | 6/2003 | Wolrich et al. |
| 2003/0115347 A1 | 6/2003 | Wolrich et al. |
| 2003/0115426 A1 | 6/2003 | Rosenbluth et al. ........ 711/154 |
| 2003/0131022 A1 | 7/2003 | Wolrich et al. |
| 2003/0131198 A1 | 7/2003 | Wolrich et al. |
| 2003/0140196 A1 | 7/2003 | Wolrich et al. |
| 2003/0147409 A1 | 8/2003 | Wolrich et al. |
| 2004/0039895 A1 | 2/2004 | Wolrich et al. ............. 712/200 |
| 2004/0054880 A1 | 3/2004 | Bernstein et al. ........... 712/245 |
| 2004/0071152 A1 | 4/2004 | Wolrich et al. ............. 370/420 |
| 2004/0073778 A1 | 4/2004 | Adiletta et al. ............. 712/220 |
| 2004/0098496 A1 | 5/2004 | Wolrich et al. ............. 709/230 |
| 2004/0179533 A1 | 9/2004 | Donovan ................. 370/395.5 |

FOREIGN PATENT DOCUMENTS

| | | |
|---|---|---|
| EP | 0 418 447 | 3/1991 |
| EP | 0 464 715 | 1/1992 |
| EP | 0 633 678 | 1/1995 |
| EP | 0 745 933 | 12/1996 |
| EP | 0 760 501 | 3/1997 |
| EP | 0 809 180 | 11/1997 |
| JP | 59111533 | 6/1984 |
| WO | WO 94/15287 | 7/1944 |
| WO | WO 97/38372 | 10/1997 |
| WO | WO 98/25210 | 6/1998 |
| WO | WO 01/15718 | 3/2001 |
| WO | WO 01/16769 | 3/2001 |
| WO | WO 01/16770 | 3/2001 |
| WO | WO 01/16782 | 3/2001 |
| WO | WO 01/48606 | 4/2001 |
| WO | WO 01/48596 | 7/2001 |
| WO | WO 01/48619 | 7/2001 |
| WO | WO 01/50247 | 7/2001 |
| WO | WO 01/50679 | 7/2001 |
| WO | WO 03/017541 | 2/2003 |

OTHER PUBLICATIONS

U.S. Appl. No. 09/473,571, filed Dec. 28, 1999, Wolrich et al.
Byrd et al., "Multithread Processor Architectures," *IEEE Spectrum*, vol. 32, No. 8, New York, Aug. 1, 1995, pp. 38-46.
Doyle et al., *Microsoft Press Computer Dictionary*, 2$^{nd}$ ed., Microsoft Press, Redmond, Washington, USA, 1994, p. 326.
Fillo et al., "The M-Machine Multicomputer," IEEE Proceedings of MICRO-28, 1995, pp. 146-156.
Gomez et al., "Efficient Multithreaded User-Space Transport for Network Computing: Desing and Test of the TRAP Protocol ," *Journal of Parallel and Distributed Computing* , Academic Press, Duluth, Minnesota, USA, vol. 40, No. 1, Jan. 10, 1997, pp. 103-117.
Haug et al., "Reconfigurable hardware as shared resource for parallel threads," IEEE Symposium on FPGAs for Custom Computing Machines, 1998.
Hauser et al., "Garp: a MIPS processor with a reconfigurable coprocessor," Proceedings of the 5$^{th}$ Annual IEEE Symposium on Field-Programmable Custom Computing Machines, 1997.
Hyde, R., "Overview of Memory Management," *Byte*, vol. 33, No. 4, 1998, pp. 219-225.
Litch et al., "StrongARMing Portable Communications," IEEE Micro, 1998, pp. 48-55.
Schmidt et al., "The Performance of Alternative Threading Architectures for Parallel Communication Subsystems," Internet Document,*Online 49*, Nov. 13, 1998.
Thistle et al., "A Processor Architecture for Horizon," IEEE, 1998, pp. 35-41.
Tremblay et al., "A Three Dimensional Register File for Superscalar Processors," IEEE Proceedings of the 28$^{th}$ Annual Hawaii International Conference on System Sciences, 1995, pp. 191-201.
Trimberger et al, "A time-multiplexed FPGA," Proceedings of the 5$^{th}$ Annual IEEE Symposium on Field-Programmable Custom Computing Machines, 1998.
Turner et al., "Design of a High Performance Active Router," Internet Document, *Online*, Mar. 18, 1999.
Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.
Wazlowski et al., "PRSIM-II compiler and architecture," IEEE Proceedings, Workshop on FPGAs for Custom Computing Machines, 1993.
Adiletta, et al., "The next generation of Intel IXP Network Processors", Intel Technology Journal, Network Processors, vol. 6, issue 3, published Aug. 15, 2002, pp. 6-18.
Kornaros, et al., "A fully-programmable memory management system optimizing queue handling at multi Gigabit rates", ACM, Jun. 2-6, 2003, pp. 54-59.
Brewer, et al., "Remote Queues: Exposing Message Queues for Optimization and Atomicity", SPAA '95 Santa Barbara, CA, pp. 1-13.
Buyuktosunoglu, A., et al., "Tradeoffs in Power-Efficient Issue Queue Design", ISLPED '02, ACM, Aug. 2002, 6 pages.
Dandamudi, S., "Multiprocessors", IEEE Computer, Mar. 1997, pp. 82-89.
Hendler, D., et al., "Work Dealing", SPAA '02, ACM, Aug. 2002, pp. 164-172.
Jonkers, H., "Queueing Models of Shared-Memory Parallel Applications", Computer and Telecommunications Systems Performance Engineering, Pentech Press, London, 1994, 13 pages.
Kumar, S., et al., "A Scalable, Cache-Based Queue Management Subsystem for Network Processors", no date, pp. 1-7.

Lymar, T., et al., "Data Streams Organization in Query Executor for Parallel DBMS", no date, 4 pages.

McLuckie, L., et al., "Using the RapidIO Messaging Unit on PowerQUICC III", Freescale Semiconductor, Inc., 2004 Rev. 1, pp. 1-19.

Michael, M., "Scalable Lock-Free Dynamic Memory Allocation", PLDI '04, ACM, Jun. 2004, pp. 1-12.

Pan, H., et al., "Heads and Tails: A Variable-Length Instruction Format Supporting Parallel Fetch and Decode", CASES 01, No. 16-17, 2001, 8 pages.

Scott, M., "Non-Blocking Timeout in Scalable Queue-Based Spin Locks", PODC '02, ACM, Jul. 2002, pp. 31-40.

\* cited by examiner

Write_Q_Descriptor_Count Command Format

WRITE QUEUE DESCRIPTOR COUNT INSTRUCTION FOR HIGH SPEED QUEUING

TECHNICAL FIELD

This invention relates to congestion management for high speed queuing.

BACKGROUND

Some network devices such as routers and switches have line speeds that can be faster than 10 Gigabits. For maximum efficiency the network devices should be able to process data packets, including storing them to and retrieving them from memory at a rate at least equal to the line rate. Network devices implement congestion avoidance algorithms such as Weighted Random Early Discard (WRED) to preserve chip resources and to regulate packet flow by probabilistically dropping packets as output queue lengths increase beyond predefined limits. The count of packets or buffers for each queue should be observable for all output queues.

DETAILED DESCRIPTION

Figure 1:
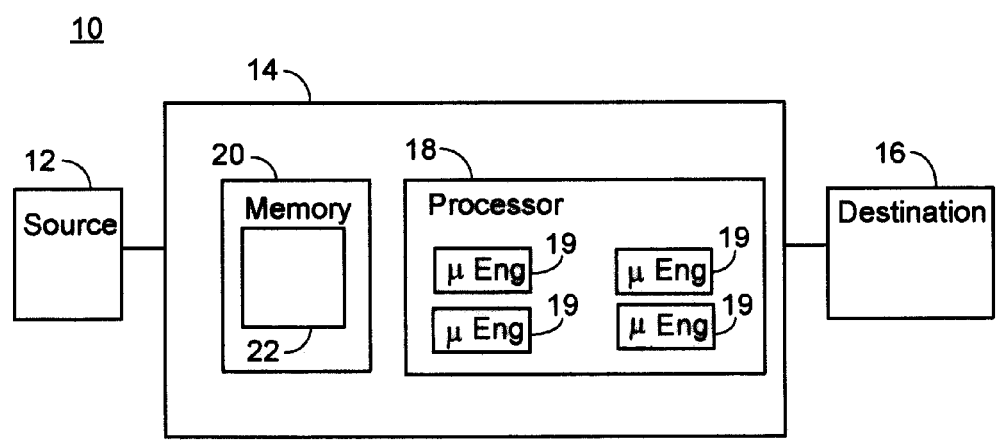
FIG. 1 is a block diagram of a network system.

Referring to FIG. 1, a network system 10 for processing data packets includes a source of data packets 12 coupled to a network device 14 and a destination for data packets 16 coupled to the network device 14. The network device 14 includes a processor 18 and a memory 20 having memory data structures 22 configured to receive, store and forward the data packets to a specified destination. Example network devices 14 are network switches, network routers and other network devices. The source of data packets 12 can include, for example, other network devices (not shown) connected over a communications path (not shown) operating at high data packet transfer line speeds. Examples of such communications paths include as an example, an optical carrier (OC)-192 line or a 10-Gigabit Ethernet line. The destination of data packets 16 may also include other network devices as well as a similar network connection.

Figure 2:
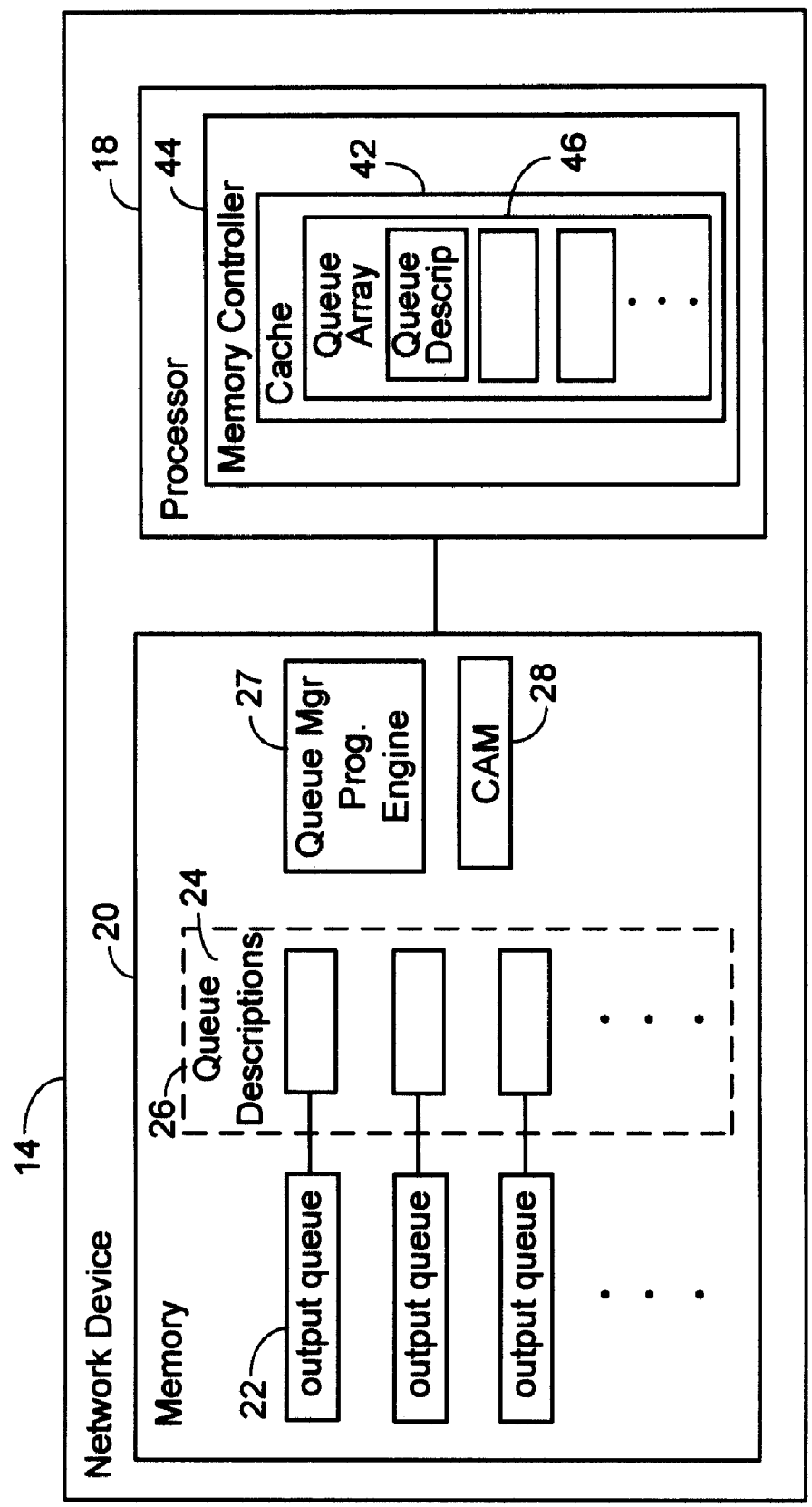
FIG. 2 is a block diagram of a network device used in the system of FIG. 1.

Referring to FIG. 2, the network device 14 includes memory 20 coupled to the processor 18. The memory 20 provides output queues 22 and their corresponding queue descriptors 24 in a queue array 26. The memory 20 includes a queue manager programming engine 27 and Content Addressable Memory (CAM) 28.

Upon receiving a data packet from the source 12 (of FIG. 1), the processor 16 performs enqueue and dequeue operations to process the packet. An enqueue operation adds information that has arrived in a data packet to one of the output queues 22 and updates its corresponding queue descriptor 24. A dequeue operation removes information from one of the output queues 22 and updates the corresponding queue descriptor 24, allowing the network device 14 to transmit the information to the appropriate destination 16.

Enqueue and dequeue operations for a large number of output queues 22 in memory 20 at high bandwidth line rates can be accomplished by storing some of the queue descriptors 24 in a cache 42 at the processor's memory controller 44. Commands to perform enqueue or dequeue operations check whether queue descriptors 24 corresponding to the enqueue or dequeue commands are stored in the cache 42. When an enqueue or a dequeue operation is required with respect to a queue descriptor 24 that is not in the cache 42 (a cache miss), the processor 18 issues commands to the memory controller 44 to move a queue descriptor 24 from the cache 42 to the memory 20 and to fetch a new queue descriptor 24 from memory 20 for storage in the cache 42. In this manner, modifications to a queue descriptor 24 made by enqueue and dequeue operations occur in the cache 42 and are copied to the corresponding queue descriptor 24 in memory 20 upon removal of that queue descriptor 24 from the cache 42.

A sixteen entry CAM 28 with a Least Recently Used (LRU) replacement policy is used to track sixteen queue descriptors 24 that are cached in a queue array 46 of the memory controller 44.

Using a network device 14 implemented as hardware-based 10 multi-threaded processor having multiple microengines 19, each CAM entry stores a 32 bit value. Microengines 19 each maintain a plurality of program counters in hardware and states associated with the program counters. Effectively, a corresponding plurality of sets of threads can be simultaneously active on each of the microengines 19 while only one is actually operating at any one time. During a lookup operation CAM entries are compared against a source operand. All entries are compared in parallel, and the result of the lookup is a 6-bit value. The 6-bit result includes a 2-bit code concatenated with a 4-bit entry number. Possible results of the lookup are three fold. A first result is a miss where the lookup value is not in the CAM 28 and the entry number is the Least Recently Used (LRU) entry which can be used as a suggested entry to replace. The second result can be a hit where the lookup value is in the CAM 28 and state bit is clear, and the entry number is an entry which has matched. In addition, a locked result may occur where the lookup value is in the CAM 28, the state bit is set and the 5 entry number is an entry. The state bit is a bit of data associated with the entry, used typically by software. There is no implication of ownership of the entry by any context.

Figure 3:
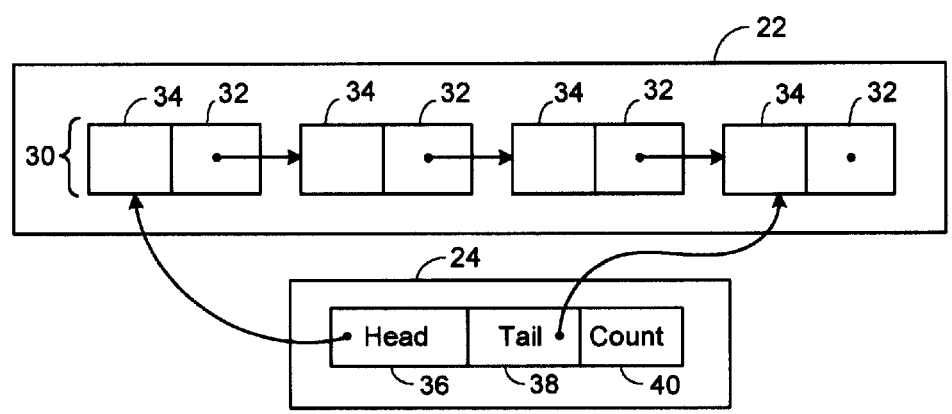
FIG. 3 is a block diagram of an output queue.

Referring to FIG. 3, an example of an output queue 22 and its corresponding queue descriptor 24 is shown. The output queue 22 includes a linked list of elements each of which has a pointer 32 to a next element's address 34 in the output queue 22. Each element in the linked list 30 includes the address 34 of information stored in memory 20 that the linked list element represents. The queue descriptor 24 includes a head pointer 36, a tail pointer 38 and a count 40. The head pointer 36 points to the first linked list element 30 of the queue 22, and the tail pointer 38 points to the last linked list element 30 of the output queue 22. The count 40 identifies a number (N) of linked list elements 30 in the output queue 22.

Figure 4:
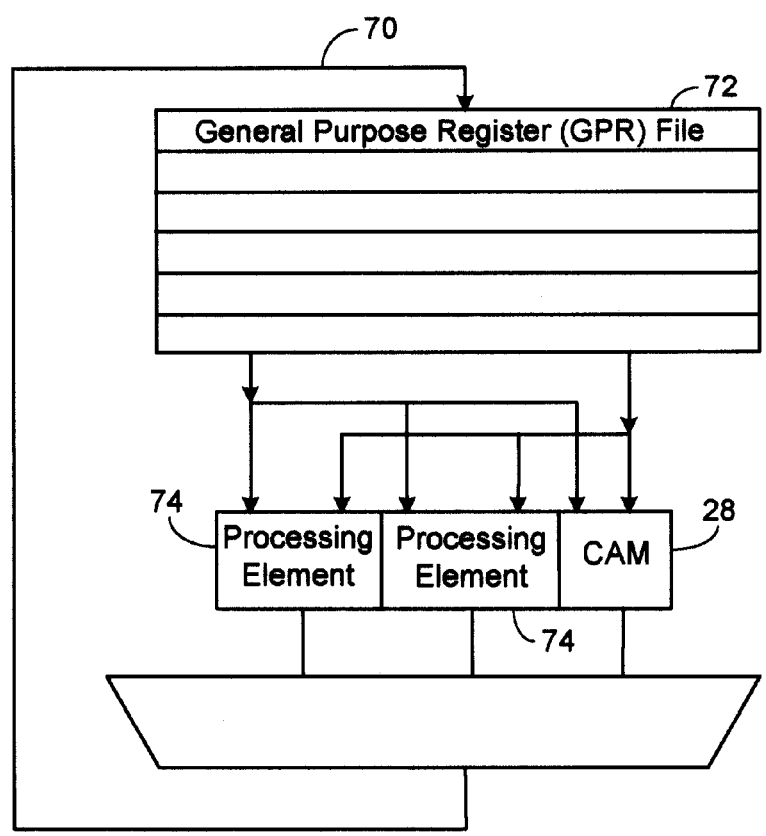
FIG. 4 is a block diagram of a datapath in a processor.

Referring to FIG. 4, details of an arrangement of the CAM 28 in a datapath 70 of the network device 14 are shown. A General Purpose Register (GPR) file 72 stores data for processing elements 74. The CAM receives operands as any other processing element 74 would. Operational code (Op-code) bits in an instruction select which processing element 74 is to perform the operation specified by the instruction. In addition, each of the processing elements 74, including the CAM 28, can return a result value from the operation specified by the instruction back to the GPR file 72.

Figure 5:
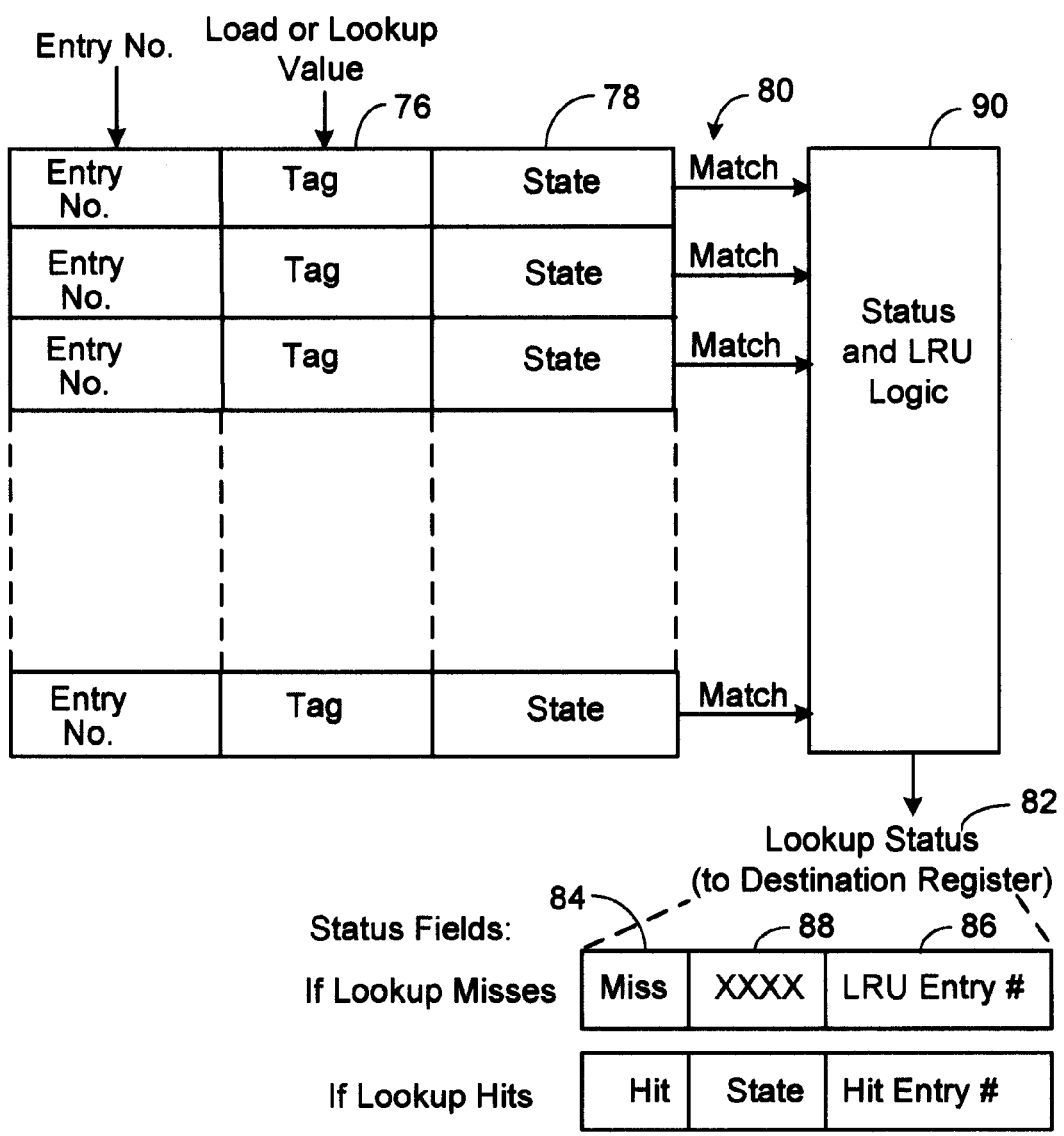
FIG. 5 is a block diagram of entries in a CAM device to track queue descriptors.

Referring to FIG. 5, a CAM 28 includes an array 76 of tags having a width the same as the width of the GPR file 72. Associated with each of the tags in the array are state bits 78. During a CAM lookup operation, a value presented from the GPR file 72 is compared, in parallel, to each of the tags in the array 76 with a resulting match signal 80 per tag. The values in each tag were previously loaded by a CAM load operation. During the CAM load operation the values from the GPR file 72 specify which of the tags in the array 76 to load and a value to load. Also during the CAM load operation the state information to load is part of the operand.

The result of the CAM lookup is written to a destination GPR file 82 and includes three fields. A hit/miss indication field 84, an entry number field 86 and a state information field 88. If a "hit" occurs, the entry number field 86 is matched. In a "miss," the entry number field 86 is the Least-Recently-Used (LRU) entry.

The following instructions are one example of instructions used to manage and use the CAM 28:

Load (Entry_Number, Tag_Value, State Value)
Lookup (Lookup_Value, Destination)
Set_State (Entry_Number, State_Value)
Read_Tag (Entry_Number, Destination)
Read_State (Entry_Number, Destination)

The LRU Logic 90 maintains a time-ordered list of the CAM 28 entry usage. When an entry is loaded or matches on a lookup, it is marked as MRU (Most Recently Used). A lookup that misses does not modify the LRU list.

If a queue descriptor 24 required for either an enqueue or dequeue is not in queue array 46, the queue manager programming engine 27 issues a write-back to memory of the LRU entry, followed by a fetch to the same entry, before issuing the enqueue or dequeue command. If the CAM 28 lookup indicates that the needed queue descriptor 24 is already in the queue array 46, then the enqueue or dequeue command is issued without replacing an entry.

Each enqueue command increments the count 40 of packets or buffers for a particular output queue 22. A dequeue command decrements the count 40 of packets or buffers when a pointer to the buffer descriptor 24 at the head of the output queue 22 is updated.

Figure 5A:
FIG. 5A is a block diagram of an instruction format.

The microengine 19 (in the processor 18 containing multiple microengines 19) tasked with congestion avoidance reads the queue descriptors 24 from memory 20 to determine the length (count word 40) of each output queue 22. The queue descriptors 24 for highly used output queues 22 can remain in the queue array 46 of the memory controller 44 for an infinitely long time period. A Write_Q_Descriptor_Count Command is issued by the queue manager programming engine 27 after the enqueue or dequeue command, when the entry used "hits" the CAM 28. As shown in FIG. 5A, the format of the command is:

Write_Q Descriptor_Count (address, entry).

The command uses two parameters, i.e., address and entry, and keeps the countfield 40 for all queue descriptors 24 current in memory 20 for the microengine implementing congestion avoidance. The write of a single word containing the queue count information for entries that hit in the query array 46 in the cache 42 replaces a write-back of two or three words when a new entry needs to be fetched.

Figure 6:
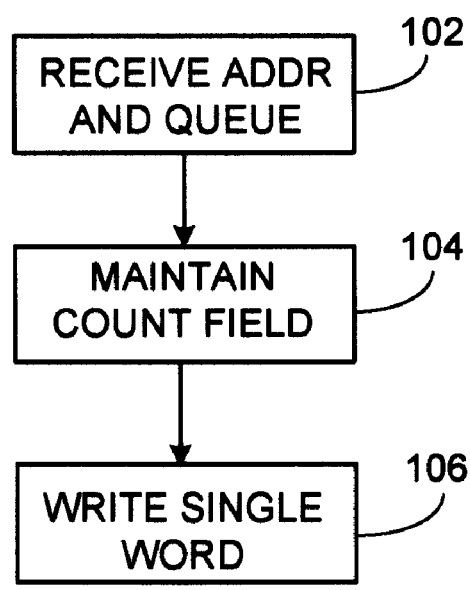
FIG. 6 is a flow diagram of a queue description update process.

Referring to FIG. 6, a write queue descriptor process 100 includes receiving (102) an address and a queue subsequent to an enqueue or dequeue command. The process 100 maintains (104) a count field for all queue descriptors current in memory for the microengine implementing congestion avoidance. The process 100 writes (106) a single word containing the queue count information for the queue entry that hits the queue array in the cache.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A computer program product, for high speed queuing, the computer program product residing on a computer readable medium and comprising instructions that when executed cause a data processing apparatus to:
   execute a write queue descriptor count instruction that causes a processor to write a single word containing a queue count for each of a plurality of queue entries in a queue array cache.

2. The computer program product of claim 1 wherein the instruction includes:
   an address field that specifies a location in memory of a queue descriptor.

3. The computer program product of claim 1 wherein the instruction includes:
   an entry field that specifies a location of a queue descriptor in the queue array cache.

4. A method comprising:
   in a network device, maintaining a count field for queue descriptors of active output queues current in a memory of the network device, wherein at least some of the count fields for queue descriptors are stored in a queue array cache.

5. The method of claim 4 in which the count field is stored in a word, the word representing a unit of data of a defined bit length.

6. The method of claim 4 further comprising:
   writing the count field subsequent to incrementing a count of buffers for a selected queue.

7. The method of claim 4 further comprising:
   writing the count field subsequent to decrementing a count of buffers for a selected queue.

8. Apparatus comprising:
   a memory containing queue descriptors representing output queues, a queue manager programming engine and a content addressable memory (CAM);
   a processor connected to the memory, the processor containing a memory controller, the memory controller having a cache containing a queue descriptor may for storing a subset of the queue descriptors; and
   an array in memory for storing a count of queue descriptors in the subset.

9. The apparatus of claim 8 further comprising:
   a plurality of microengines.

10. A computer program product residing on a computer readable medium having instructions stored thereon which, when executed by a processor, cause the processor to:
    maintain a count field for queue descriptors of active output queues current in a memory.

11. The computer program product of claim 10 in which the count field is stored in a word, the word representing a unit of data of a defined bit length.

12. The computer program product of claim 10 further comprising instructions to:
    write the count field subsequent to incrementing a count of buffers for a selected queue.

13. The computer program product of claim 10 further comprising instructions to:
    write the count field subsequent to decrementing a count of buffers for a selected queue.

* * * * *